Jan. 11, 1955     B. SPIETH     2,699,234
TRIM MOLDING
Filed Feb. 26, 1949     2 Sheets-Sheet 1
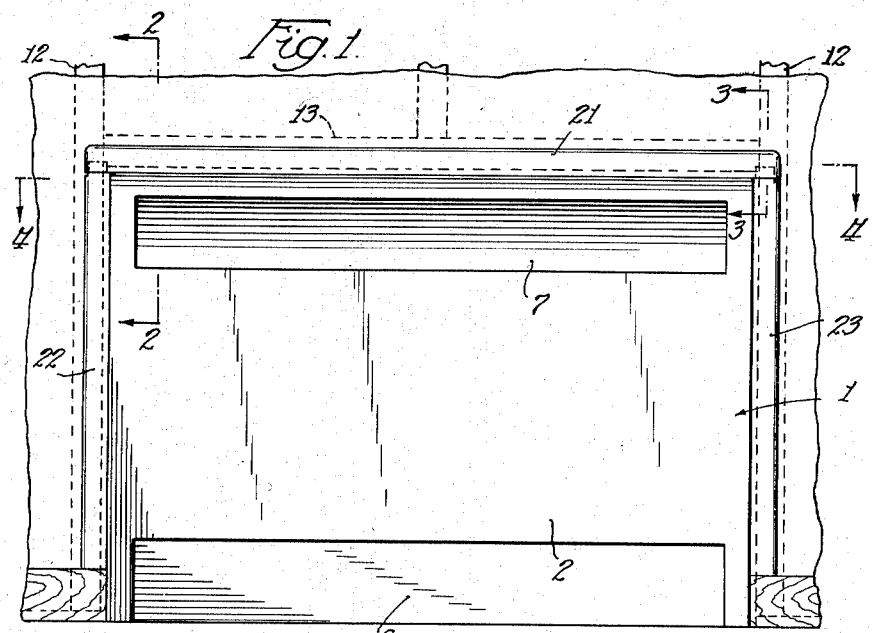
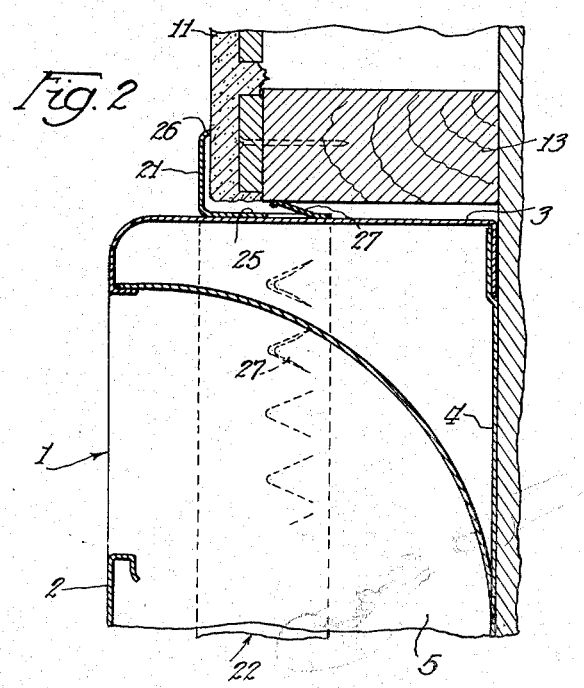
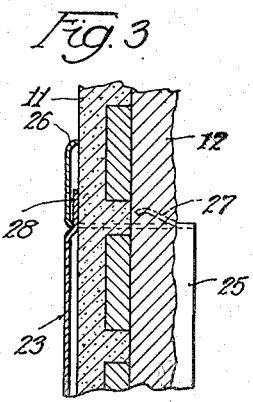
Inventor
Benjamin Spieth
By: Hill & Hill Attys.

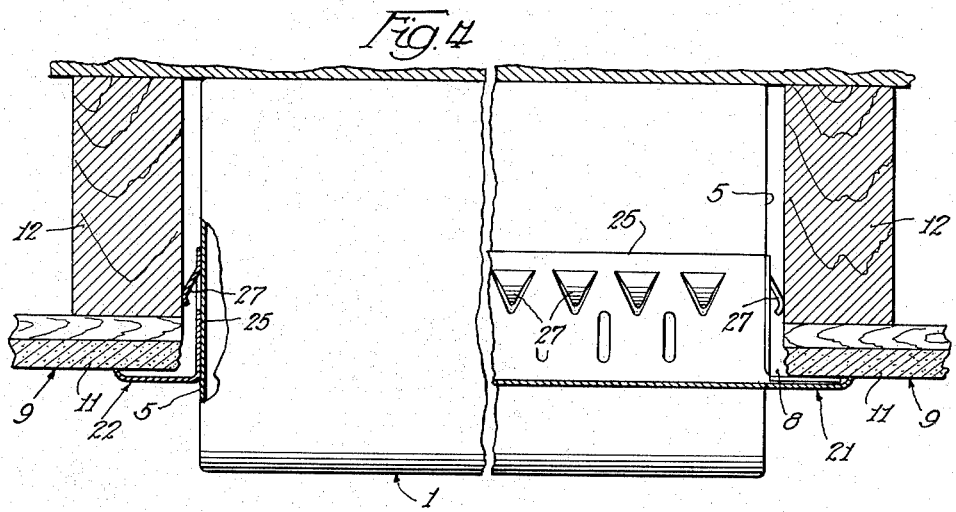
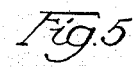
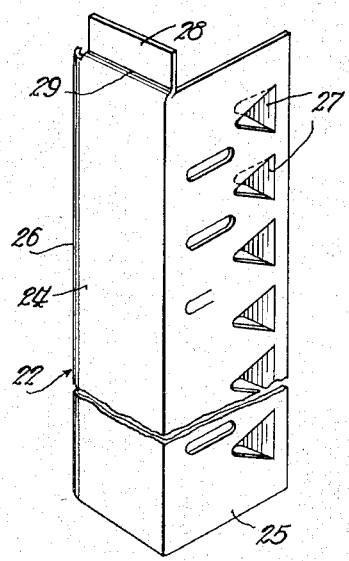
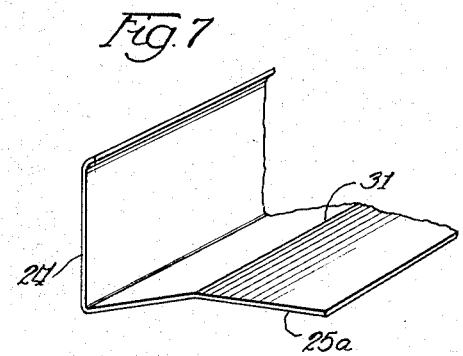
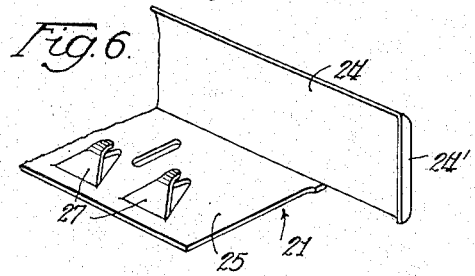
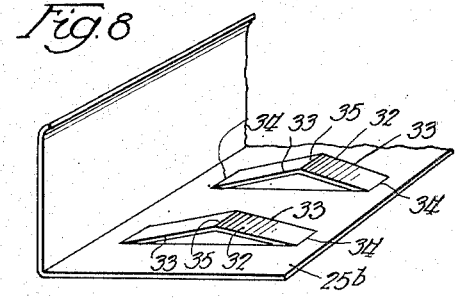

United States Patent Office 2,699,234
Patented Jan. 11, 1955

2,699,234

TRIM MOLDING

Benjamin Spieth, Racine, Wis., assignor to Modine Manufacturing Company, Racine, Wis., a corporation of Wisconsin Application February 26, 1949, Serial No. 78,521

5 Claims. (Cl. 189—88)

This invention relates generally to a trim molding, and more particularly to a molding adapted for use with wall cabinets or the like.

The invention is particularly adapted for use in connection with heat convector and air conditioning cabinets, or the like, wherein the cabinet or enclosure may be partially or wholly inset into a wall, and the invention will, therefore, be disclosed in connection with a cabinet such as those employed in convector type heating equipment.

It has been common practice in the past to manufacture two lines of convector type cabinets, one for use where the cabinet is to be positioned wholly within the room to be heated, in which case the cabinet is normally spaced a slight distance from the adjacent wall; and the other for use where the cabinet is to be inset or recessed into the wall, in which case the front section of the cabinet is normally made slightly larger than the recess into which the cabinet proper is to be placed, whereby the front section will slightly overlie the wall adjacent the edges of the recess, thereby concealing the latter. It will be apparent that in such construction the necessity of making the front section removable requires a joint between the cabinet proper and such front section, creating a problem of air leakage through such joint. It is particularly desirable to prevent such leakage as the passage of air therethrough results in streaks of dirt on the wall surface, and attempts have been made to correct this difficulty by employing a felt or rubber sealing strip. However, as the wall surface is normally somewhat irregular, efficient sealing of the joint from a practical standpoint is very difficult. Likewise, as the cabinet can be installed only at one pre-determined depth, cabinets of different dimensions are necessarily required for each change in the depth dimension. In view of the above, it will be apparent that it would be particularly desirable to be able to employ the standard type of convector cabinet adapted to be positioned inside the room to an inset construction, as the room type of cabinet may be readily produced in an inherently leak-proof construction.

The present invention, therefore, has among its objects the production of a molding by means of which a convector cabinet of leak-proof construction may be employed in a wall recess with the molding concealing the edges of the wall opening to provide a neat and pleasing appearance. Likewise, the present invention enables the cabinet to be wholly recessed or, if desired, any desired amount of the cabinet may be recessed with the remainder extending out from the wall surface and, as a result, a single type of cabinet may be employed for use either as a wall type cabinet or as a room type cabinet without any change in the construction thereof, and without regards to the depth of the recess.

Another object of the invention is the production of such a molding neat and pleasing in appearance, which is so constructed that screws or other separate fastening means are eliminated, at the same time providing concealed means for firmly securing the molding in its desired position.

A further object of the invention is the production of such a molding which is very simple in construction, inexpensive to manufacture, and very efficient for the purposes intended.

Many other objects and advantages of the construction herein shown and described will be obvious to those skilled in the art from the disclosure herein given.

To this end my invention consists in the novel construction, arrangement, and combination of parts herein shown and described, and more particularly pointed out in the claims.

In the drawings, where like reference characters indicate like or corresponding parts:

Fig. 1 is a front elevational view of a cabinet partially recessed into a wall structure with the present invention applied thereto;

Fig. 2 is a sectional view taken approximately on the line 2—2 of Fig. 1;

Fig. 3 is a sectional view through the molding and wall taken approximately on the line 3—3 of Fig. 1;

Fig. 4 is a sectional view taken approximately on the line 4—4 of Fig. 1;

Fig. 5 is a perspective view of the top portion of the vertical side molding element;

Fig. 6 is a perspective view of an end of the horizontal molding strip;

Fig. 7 is a perspective view of a modified form of the invention; and

Fig. 8 is a similar perspective view of another modified form of the invention.

Referring to the drawing, and more particularly to Figs. 1 and 2, 1 indicates generally a convector cabinet having a front wall 2, top wall 3, rear wall 4, and side walls 5, the front wall 2 having an air inlet opening 6 adjacent the bottom thereof, and an air outlet opening 7 adjacent the top thereof. The cabinet 1 may be constructed in any suitable manner, the details of which form no part of the present invention.

As illustrated in Figs. 2 and 4, the cabinet 1 may be inset into a recess 8 in a wall 9, the front face of the wall 9, in the present instance, having a coating of plaster 11 thereon, with the recess being defined by studding 12 and a header 13.

As illustrated in Fig. 1, the molding extends along the top and vertical side walls of the cabinet adjacent the wall edges, thereby concealing the latter. In the construction illustrated, the molding is formed in 3 sections consisting of a horizontal top member 21 and vertical side members 22 and 23. Each of the members 21, 22, 23 are formed from a strip of sheet material, such as stainless sheet metal, or the like, each strip being longitudinally bent to provide a trim element 24 and a mounting element 25, the latter, in the present instance, extending substantially at right angles to the plane of the element 24, with the free longitudinal edge of the latter being curved, as shown at 26. All of the respective sections are similarly constructed and, while the trim elements 24 are illustrated, in the present instance, as being unornamented, obviously, if desired, various forms of ornamentation could be applied thereto.

In the construction illustrated in Figs. 2, 4, 5, and 6, the mounting element 25 is provided with a plurality of triangular tongues 27, the side edges of the tongues being severed from the element 25, whereby the tongue may be bent inwardly, as clearly shown in Fig. 6. The tongues 27 co-operate with the other portions of the element 25 to retain the molding in operative position, as illustrated in Figs. 2 and 4, as the tongues 27 will engage the studding 12 or the header 13, thereby urging the element 25 into engagement with the side walls 5 or top walls 3 of the cabinet to, in effect, wedge the element 25 therebetween. The sections of the molding are preferably made out of material having suitable inherent resiliency to provide a continuous wedging action on the mounting element 25 of the molding, thereby securely maintaining the latter in the desired position. Likewise, due to the triangular shape of the tongues 27, the pointed ends thereof will tend to resist undesired loosening or removal of the molding.

As illustrated in Fig. 6, the trim element 24 of the top section 21 extends outwardly beyond the mounting element 25, the distance of such extension being substantially equivalent to the width of the element 24, so that when the vertical sections 22 and 23 are placed in position, the end edges of the element 24 will be co-extensive with the outer edges of the respective vertical sections, thereby imparting the appearance of a continuous molding extending around the side and top walls of the cabinet. As illustrated in Fig. 5, the upper ends of the vertical sections 21 and 22 are each provided with a tongue member 28, the latter being inset inwardly, as indicated at 29, the amount of inset being substantially equivalent to the thickness of the material employed. Thus when the sections are placed in the desired positions, the extension 24' of the trim element 24 of the top section overlies the tongue 28 of the particular vertical section, as illustrated in Fig. 3, thereby concealing the edge of the wall recess and providing a neat and substantially unnoticeable joint between the two sections. The two vertical sections illustrated are identical in general construction, the only difference being that they are made in rights and lefts to accommodate the opposite sides of the cabinet.

In the construction illustrated in Fig. 7, the mounting element 25a is provided with a continuously extending longitudinal bend therein, as indicated at 31, whereby the longitudinal edges of the element 25a, at the free edge thereof and the juncture of the element with the trim element 24, are positioned substantially in a common plane with the bend 31 spaced inwardly therefrom. Thus when the molding illustrated in Fig. 7 is inserted between the adjacent wall of the cabinet and the studding 12 or header 13, the portions of the mounting element 25a adjacent the longitudinal edges thereof will engage the side wall of the cabinet, while the portion adjacent the bend 31 will engage the adjacent interior surface of the recess, thereby wedging the mounting element between the wall of the recess and the adjacent wall of the cabinet in a manner similar to the action of the tongues 27 and adjacent portions of the element 25.

The construction illustrated in Fig. 8 is similar to that illustrated in section 7, with the exception that instead of providing the mounting element with a continuous longitudinal bend, the mounting element 25b is provided with a plurality of strips 32 formed from the material comprising the element 25b by severing the strips along their side edges 33 from the element 25b and deforming the strips inwardly with both ends 34 of the respective strips remaining connected to the element 25b. In the construction illustrated, the strips 32 are each formed with a longitudinally extending bend 35, whereby the cross-sectional shape of the strips is similar to the cross-sectional shape of the element 25a. Obviously, if desired, the particular shape of the strips may be varied to accommodate different applications of the device. In use, upon insertion of the mounting element 25b between the adjacent wall of the recess and cabinet, the strips 32 will engage the studding 12 or header 13 with the remainder of the mounting element seated upon the wall of the cabinet.

As has been mentioned with respect to the construction illustrated in Fig. 5, the moldings illustrated in Figs. 7 and 8 are likewise preferably formed from suitable material having sufficient inherent resiliency to satisfactorily maintain the particular molding in the desired positions.

It will be apparent from the above disclosure that I have provided a very simple molding construction which may be readily and inexpensively manufactured, and which is neat and pleasing in appearance. Likewise, I have provided a molding by means of which cabinets of standard construction may be recessed into a wall, or other surface, without the necessity of modifying the cabinet construction.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. In a detachable trim molding for concealing the clearance space between a wall structure and a cabinet-like member having planar exterior peripheral edge surface positioned in a recess in said wall structure and extending transversely to the exterior face of the wall structure, the combination of a strip of material, which is less in thickness than the width of said clearance space, formed lengthwise to provide a trim element the width of which is greater than that of the clearance space to be concealed, and a transversely extending mounting element, the longitudinal marginal edges of said mounting element being adapted to engage said planar surface with the points of engagement therebetween lying in substantially a common plane, and an intermediate portion between said first-mentioned edges, said intermediate portion being relatively resilient and normally extending upwardly from said plane on the same side as said trim element a distance greater than the width of said clearance space whereby said intermediate portion, when positioned in said clearance space, will engage said adjacent wall structure and the first-mentioned marginal edges will engage the planar surface of said member with the marginal edges and intermediate portion co-operating to exert pressure on such wall structure and said cabinet-like member and thereby retain said molding in operative position with the trim element extending across and concealing said clearance space.

2. In a detachable elongated trim molding for concealing the clearance space between a wall structure and the exterior surface of a member positioned in a recess in such a wall structure and extending transversely to the latter, the combination of a strip of material formed lengthwise to provide a trim element the width of which is greater than that of the clerance space to be concealed and a transversely extending resilient mounting element, the longitudinal marginal edge portions of said mounting elements being adapted to abut the exterior surface of said member, said mounting element being formed to provide relatively resilient portion intermediate the marginal edge portions and extending transversely upwardly with respect to said marginal edge portions on the same side as the trim element a distance greater than the width of said clearance space with the uppermost part thereof laterally positioned between such marginal edge portions whereby said uppermost part, when the mounting element is positioned in said clearance space, will engage the adjacent wall structure and co-operate with said first-mentioned marginal edge portions to exert pressure on said wall structure and said member and thereby frictionally retain said molding in a substantially fixed position with the trim element extending across and concealing said clearance space.

3. In a recessed cabinet mounting, the combination of a cabinet structure, including a side wall surface and a top wall surface, a wall structure having a recess therein, said cabinet structure being positioned at least partially in said recess, said recess being slightly larger than the cabinet peripherally forming a relatively narrow peripheral clearance space between the cabinet and the adjacent interior surface of the recess, and a molding having a mounting element positioned between a wall of the cabinet and the adjacent interior surface of said recess forming the aforesaid peripheral clearance space, with portions of the mounting element complementally formed to the relatively narrow peripheral space and engaging both adjacent wall and recess surfaces, certain of said portions of the mounting element intermediate the longitudinally extending marginal outer and inner edges of said mounting element, resiliently and frictionally engaging the surface of the recess contiguous thereto, the other of said portions peripherally abutting the surrface of the cabinet between the cabinet and the peripheral edge of the recess, and the outer edge of said mounting element positioned adjacent the juncture of the exterior wall surface contiguous to the peripheral edge of the recesss and the cabinet, and a trim element carried by and extending transversely to the mounting element from the adjacent cabinet surface to overlie the marginal portion of the exterior wall surface adjacent said recess, the aforementioned outer marginal edge formed by the juncture of the mounting element and the trim element and also conceal the narrow peripheral space between the recess in the wall structure and the adjacent cabinet surface.

4. In a trim molding for closing a space left between two slightly spaced supporting members, the combination of a strip of sheet material formed lengthwise to provide two surfaces extending transversely to each other, one of said surfaces constituting a trim element and the other a mounting element, the latter having a longitudinally extending continuous bend therein intermediate the edges of said mounting element to form an apex and extending in the direction of and above the juncture between the trim element and mounting element to provide a pair of spaced portions, certain elements thereof lying in substantially a common plane when passed parallel to a plane including edges of the mounting element, with the intermediate portion adjacent said bend being positioned out of the plane of the other portions, said mounting element being adapted to be positioned in the space between the aforesaid two supporting members spaced apart a distance less than the height of the apex above the edges of the mounting element whereby the respective portions engage the aforesaid members to retain said trim molding in position with the trim element concealing the space between said members.

5. In a trim molding for closing a space left between slightly spaced supporting members, the combination of a strip of sheet material formed lengthwise to provide two surfaces extending transversely to each other, one of said surfaces constituting a trim element and the other a mounting element, the latter having laterally spaced portions lying in substantially a common plane, and a plurality of longitudinally spaced transversely extending rectangular strip portions having an upwardly extending bend and joined at opposite ends to said mounting element to form an apex with the intermediate portions of such strips positioned upwardly above the plane of the other portions thereof and on the same side of the mounting element as the trim element, said mounting element being adapted to be positioned in the space between the aforesaid two supporting members spaced apart a distance less than the height of the apex to said strip portions, whereby elements of the respective strip portions and said mounting element engage the aforesaid members to retain said trim molding in position with the trim element concealing the space between said members.

References Cited in the file of this patent

UNITED STATES PATENTS

| Number | Name | Date |
|---|---|---|
| 997,214 | Steiner | July 4, 1911 |
| 1,312,056 | Shaw | Aug. 5, 1919 |
| 1,843,264 | Bales | Feb. 2, 1932 |
| 1,907,527 | Erskine | May 9, 1933 |
| 1,942,137 | Connell et al. | Jan. 2, 1934 |
| 2,117,489 | Madsen | May 17, 1939 |
| 2,269,551 | Powell | Jan. 13, 1942 |
| 2,293,292 | Goellner | Aug. 18, 1942 |
| 2,525,595 | Fergueson | Oct. 10, 1950 |